US012192390B2

(12) United States Patent
Muddle et al.

(10) Patent No.: US 12,192,390 B2
(45) Date of Patent: *Jan. 7, 2025

(54) PERMISSIBLE CODE ANALYSIS

(71) Applicant: Via Science, Inc., Somerville, MA (US)

(72) Inventors: John Christopher Muddle, Barcelona (ES); Jeremy Taylor, Montreal (CA)

(73) Assignee: Via Science, Inc., Somerville, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/363,151

(22) Filed: Aug. 1, 2023

(65) Prior Publication Data

US 2024/0073044 A1 Feb. 29, 2024

Related U.S. Application Data

(63) Continuation of application No. 17/903,264, filed on Sep. 6, 2022, now Pat. No. 11,784,836.

(Continued)

(51) Int. Cl.
*H04L 29/06* (2006.01)
*G06F 8/41* (2018.01)
(Continued)

(52) U.S. Cl.
CPC .............. *H04L 9/50* (2022.05); *G06F 8/427* (2013.01); *H04L 9/3247* (2013.01)

(58) Field of Classification Search
CPC ......... H04L 9/50; H04L 9/3247; G06F 8/427; G06F 21/6245; G06N 20/00
See application file for complete search history.

(56) References Cited

U.S. PATENT DOCUMENTS 8,316,237 B1 * 11/2012 Felsher ................ H04L 9/3249
380/282
10,003,599 B2 6/2018 Shi et al.
(Continued)

FOREIGN PATENT DOCUMENTS

WO 20200122902 A1 6/2020

OTHER PUBLICATIONS

Shokri, Reza, and Vitaly Shmatikov. "Privacy-preserving deep learning." Proceedings of the 22nd ACM SIGSAC conference on computer and communications security. 2015. (Year: 2015).*

(Continued)

*Primary Examiner* — Ka Shan Choy
(74) *Attorney, Agent, or Firm* — Pierce Atwood LLP

(57) ABSTRACT

A computing system that is configured to receive requests to send computer executable programs to a data owner system associated with a data source for execution of the computer executable program by the data owner system. The data owner system may store to a blockchain a permitted list of programming functions, function libraries, function syntax definitions, and execution environment requirements. The computing system may be further configured to retrieve the permitted lists. The computing system may be further configured to evaluate the computer executable program using the permitted lists to determine if the computer executable program may be executed by the data owner system. The evaluation may be performed by generating an abstract syntax tree of the computer executable program. The computing system may be further configured to send the computer executable program to the data owner system if the computer executable program satisfies the conditions of the permitted lists.

20 Claims, 8 Drawing Sheets

Related U.S. Application Data

(60) Provisional application No. 63/241,602, filed on Sep. 8, 2021.

(51) Int. Cl.
*H04L 9/00* (2022.01)
*H04L 9/32* (2006.01)

(56) References Cited

U.S. PATENT DOCUMENTS

| | | |
|---|---|---|
| 11,521,090 B2 | 12/2022 | Wang et al. |
| 11,784,836 B2 | 10/2023 | Muddle et al. |
| 2015/0350215 A1* | 12/2015 | Shi ................ G06Q 10/101 |
| | | 726/26 |
| 2020/0050951 A1* | 2/2020 | Wang ............... G06N 20/00 |
| 2020/0394327 A1* | 12/2020 | Childress ......... G06F 16/1824 |
| 2022/0188433 A1* | 6/2022 | Hung ................. G06F 21/51 |

OTHER PUBLICATIONS

International Search Report and Written Opinion mailed Dec. 20, 2022 for International Patent Application No. PCT/US2022/042610), filed on Sep. 6, 2022, 11 pages.

International Preliminary Report on Patentability issued on Mar. 5, 2024 for International Patent Application No. PCT/US2022/042610), filed on Sep. 6, 2022, 8 pages.

* cited by examiner

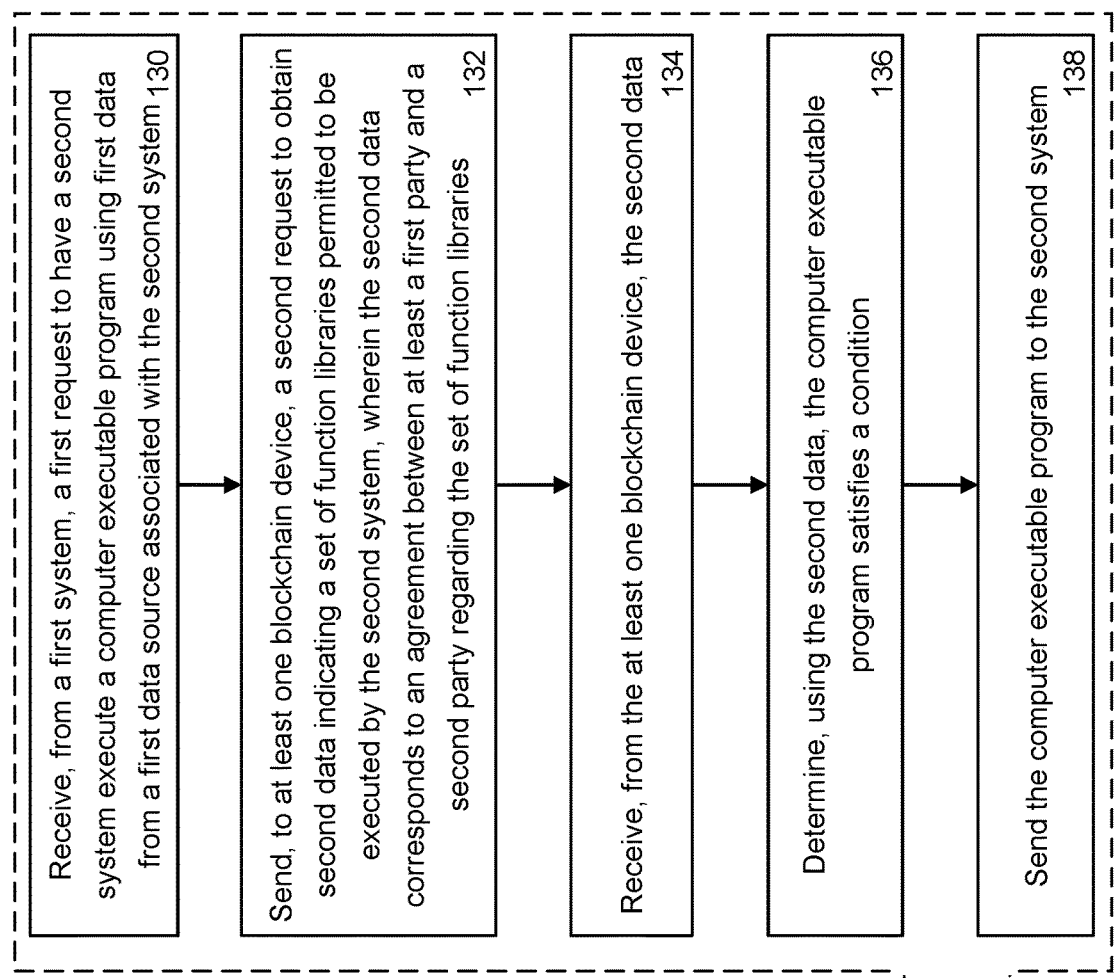
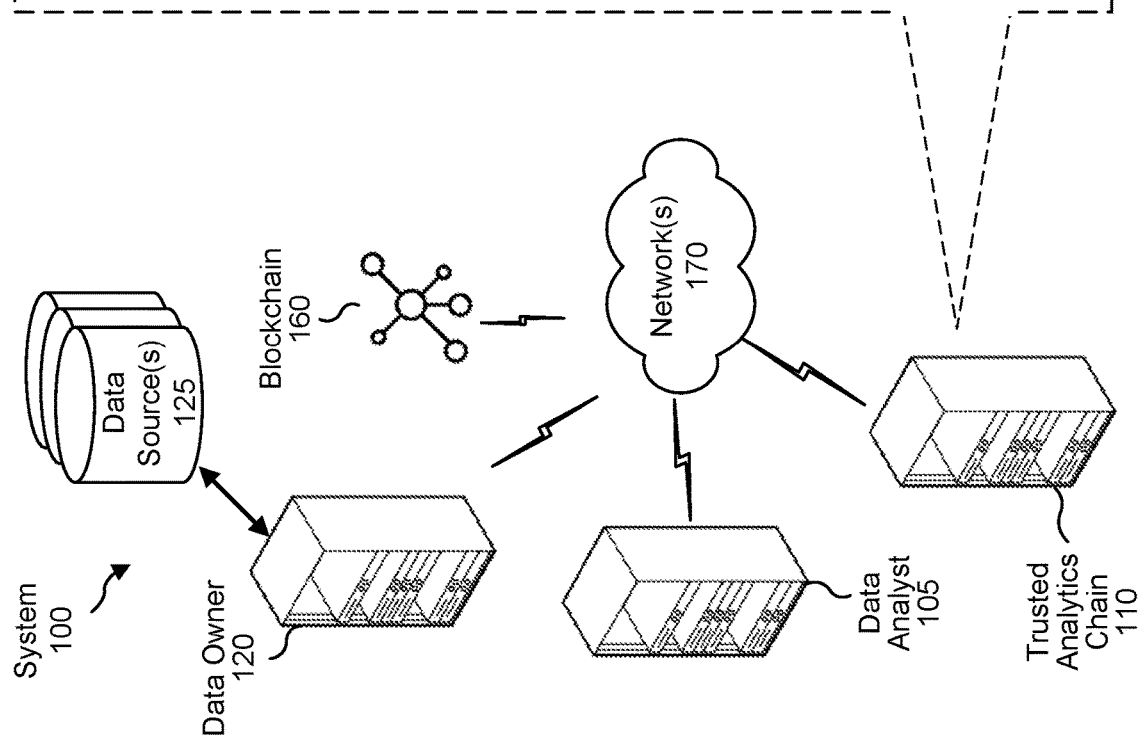
FIG. 1

PERMISSIBLE CODE ANALYSIS

CROSS-REFERENCE TO RELATED APPLICATION DATA

This application is a continuation of, and claims the benefit of priority to U.S. Non-Provisional patent application Ser. No. 17/903,264, filed Sep. 6, 2022, and entitled "Permissible Code Analysis," which claims the benefit of and priority to U.S. Provisional Patent Application No. 63/241,602, filed Sep. 8, 2021, and entitled "Scanning, Sanitizing, and Executing Data Queries from Syntax Trees," in the name of John Muddle, et al. The above applications are herein incorporated by reference in their entirety.

BACKGROUND

Data security and encryption is a branch of computer science that relates to protecting information from disclosure to other systems and allowing only an intended system access to that information. The data may be encrypted using various techniques, such as public/private key cryptography and/or elliptic cryptography, and may be decrypted by the intended recipient using a shared public key and a private key and/or other corresponding decryption technique. Transmission of the data is protected from being decrypted by other systems at least by their lack of possession of the encryption information.

BRIEF DESCRIPTION OF THE DRAWINGS

Objects, aspects, features, and advantages of embodiments disclosed herein will become more fully apparent from the following detailed description, the appended claims, and the accompanying figures in which like reference numerals identify similar or identical elements. Reference numerals that are introduced in the specification in association with a figure may be repeated in one or more subsequent figures without additional description in the specification in order to provide context for other features, and not every element may be labeled in every figure. The drawings are not necessarily to scale, emphasis instead being placed upon illustrating embodiments, principles and concepts. The drawings are not intended to limit the scope of the claims included herewith.

FIG. 1 illustrates a system for determining permissible functions for program execution, in accordance with some embodiments of the present disclosure.

SUMMARY

Figure 2:
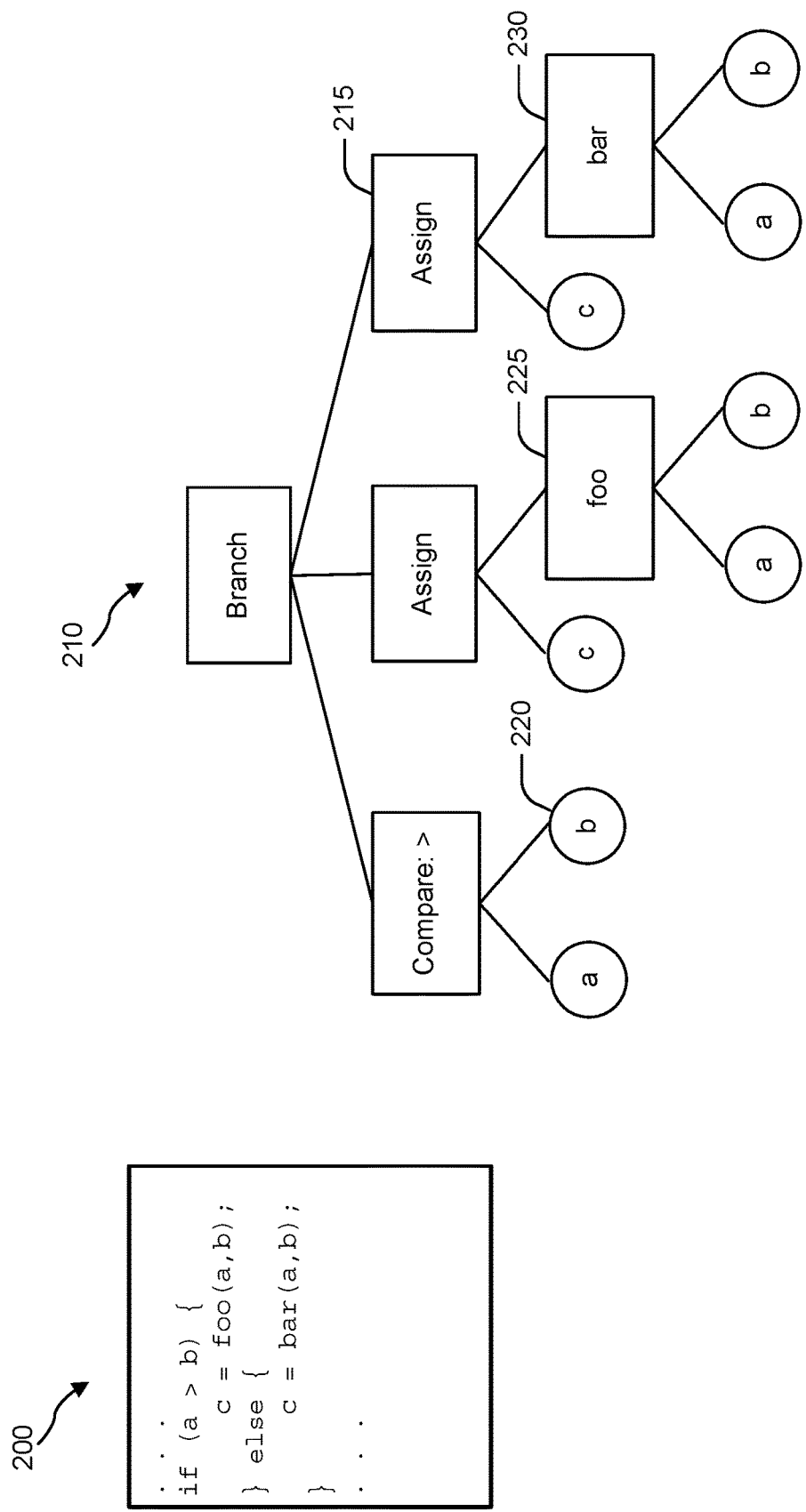
FIG. 2 illustrates an example abstract syntax tree, in accordance with some embodiments.

A system and method for allowing execution of a computer program by determining the functions of the program correspond to a set of permissible functions for program execution. A first request is received from a first system to have a second system execute a computer executable program using first data from a first data source associated with the second system. A second request is sent to at least one blockchain device to obtain second data indicating a set of functions permitted to be executed by the second system, wherein the second data corresponds to an agreement between at least a first party and a second party regarding the set of functions. Second data is received from the at least one blockchain device. The system determines, using the second data, the computer executable program satisfies a condition. The system sends the computer executable program to the second system.

DETAILED DESCRIPTION

As software services are developed, including those that use forms of artificial intelligence or machine-learning, there is a greater demand for data to develop and train these services. Machine-learning systems, such as those that use neural networks or other machine-learning components, may be trained using training data and then used to make predictions of events using out-of-sample (i.e., non-training) data. The data for training and developing the software services and machine-learning systems may be acquired from a data owner (DO) that may provide access to the data of one or more data sources. In some instances the software services may be directed toward data sensitive arenas, such as medical, financial, energy, or defense or other areas in which the data to be analyzed involves sensitive information that an entity may not wish to share with another party such as a model/service developer, data analyst, or the like.

To assist in the development of the software services and machine-learning systems while maintaining the privacy of sensitive information, data owners may provide different forms of access to their data sources. In some instances, the form of access may allow for the service developer, or data analyst, to provide computer executable program(s) to the data owners for execution. The data owner may execute the program and return the results (such as model training results or neural network weights) to the data analyst. Federated learning employs techniques in which a machine learning algorithm is trained individually using local data sets from multiple localized data sources. The resulting parameters (e.g., weights and biases of a neural network) from each of the localized data sources are then exchanged, or returned, to the model builder for retraining/configuring of a model based on information acquired from many different sources.

Sending computer programs to the data owner for execution by the data owner may reduce the risk of exposing the data owner's data as a result of transmitting the data outside the control of the data owner, such as to the data analyst or an intermediary third party. However, by executing the program themselves, the data owner may risk executing malicious code. In some instances, however, the data analyst may be protective of the computer program to be executed, such as if the program comprises the training of a machine-learning model or otherwise involves operations or information that is considered sensitive by the data analyst/model developer. The data analyst may not want to expose the code of their program to the data owner (or other external party) and thus may provide only the executable version of the program which may protect certain sensitive information about the program but may be difficult for the data owner to evaluate for risks, etc. As the data owner cannot evaluate the code or the actions performed by the executable program, the data owner cannot determine what actions, including those that may be malicious, the program may perform when executed.

In some embodiments, one or more data owners may determine a set of permissible functions for computer programs sent to be executed by the data owner. These permissible functions may be identified in a permitted list. The permitted list may include additional requirements such as function syntax and function library versions. The permitted list(s) may be stored on a blockchain, such that the permitted list(s) may be publicly available but also not modifiable. A data analyst or program developer may access the permitted lists stored on the blockchain to write programs for execution by the data owners that are compliant with the permitted list(s). This provides a level of assurance for the data analyst as they know the program will be permitted to execute as well as a level of assurance for the data owner as they know the program will only include functions approved by the data owner.

The methods and techniques described herein determine permissible programs at a function level by accessing an immutable record of permissible programming functions stored on a blockchain. These methods and techniques may provide for variation in the types or number of permissible functions based on factors such as the data to be accessed, the number of requested data owners and/or data sources, and level of trust for the data analyst (e.g., the requestor). For example, a greater number of permissible functions may be available when a data owner provides access to less sensitive data. Additionally, these methods and techniques provide flexibility for a data analyst or model builder to construct programs however they desire, as long as the program complies with the permissible programming functions.

A system, such as a trusted analytics chain (TAC), may be configured to retrieve permitted lists from the blockchain and evaluate submitted programs for compliance with the permitted lists before sending the submitted programs to one or more data owner systems for execution. The TAC may manage program execution requests, determining rule compliance, and provide delivery of data output. The TAC may maintain a secure computing/network environment for the secure transfer of data and compliance enforcement to prevent unwanted data exposure. The TAC may be considered a type of manager between the data analysts systems and the data owner systems to provide regulation of what programs and data is exchanged.

The system may receive permitted lists corresponding to the software function libraries. The permitted lists may identify a correspondence between common or known functions, such as from publicly available libraries or packages, and the functions defined by the data owner in the provided function libraries (which may be customized for particular uses). For example, TensorFlow is a popular software library for use with machine learning and artificial intelligence. The data owner may not permit direct TensorFlow function calls to be made in programs executed by the data owner. However, a permitted list may identify permitted functions provided in a function library from the data owner. The permitted functions identified in the permitted list may correspond to functions from the TensorFlow software library, although the permitted functions may differ in some ways to fit security or restrictions required by the data owner.

The system may receive permitted lists from data owners or may generate one or more permitted lists based on the input received from the one or more data owners. Permitted lists may be generated based on different factors, such as the programming language, a security level, the amount of data, or type of data requested. For example, if the data owner is familiar with the data analyst, the data owner may allow the data analyst access to a greater number of functions. In another example, the number or type of functions may be limited if the requested data source includes sensitive or personal information.

Permitted lists may be generated based on levels of granularity, such as individual functions or whole function libraries. For example, a data owner may indicate in a restriction list that the whole TensorFlow library is permitted. In another instance, a restriction list may identify several select functions from the TensorFlow library are permitted. A data owner may indicate one or more permitted lists to be used to identify permissible functions for any given program. The permitted lists may be previously agreed upon by one or more data owners and may be stored using a public ledger such as a blockchain that provides a consensus among the protocol actors of the allowed functions and syntaxes.

As part of the trusted analytics workflow, the permitted lists stored in the blockchain by the data owner may be accessed, but not altered, by the data analyst. The data analyst may then use the permitted functions and/or function libraries identified in the provided permitted list(s), such as those permitted list(s) corresponding to a particular data owner, to develop the program by the data analyst. Because of the immutable nature of the blockchain, it is not possible for a data analyst or nefarious actor to alter the permitted lists, and thus ultimately have submitted programs with non-permitted functions to be executed by a data owner. Additionally, by publishing the function libraries to the blockchain, other entities may access for review, but not modify, the function libraries, such as a developer contracted by the data analyst.

The permitted lists may include additional environmental information for permitting the execution of the program. Environmental factors may include versions of software packages, required software containers, or system level libraries required by some programming languages. The permitted list may identify permitted software packages by a version number or a specific hash associated with the package library.

Figure 5:
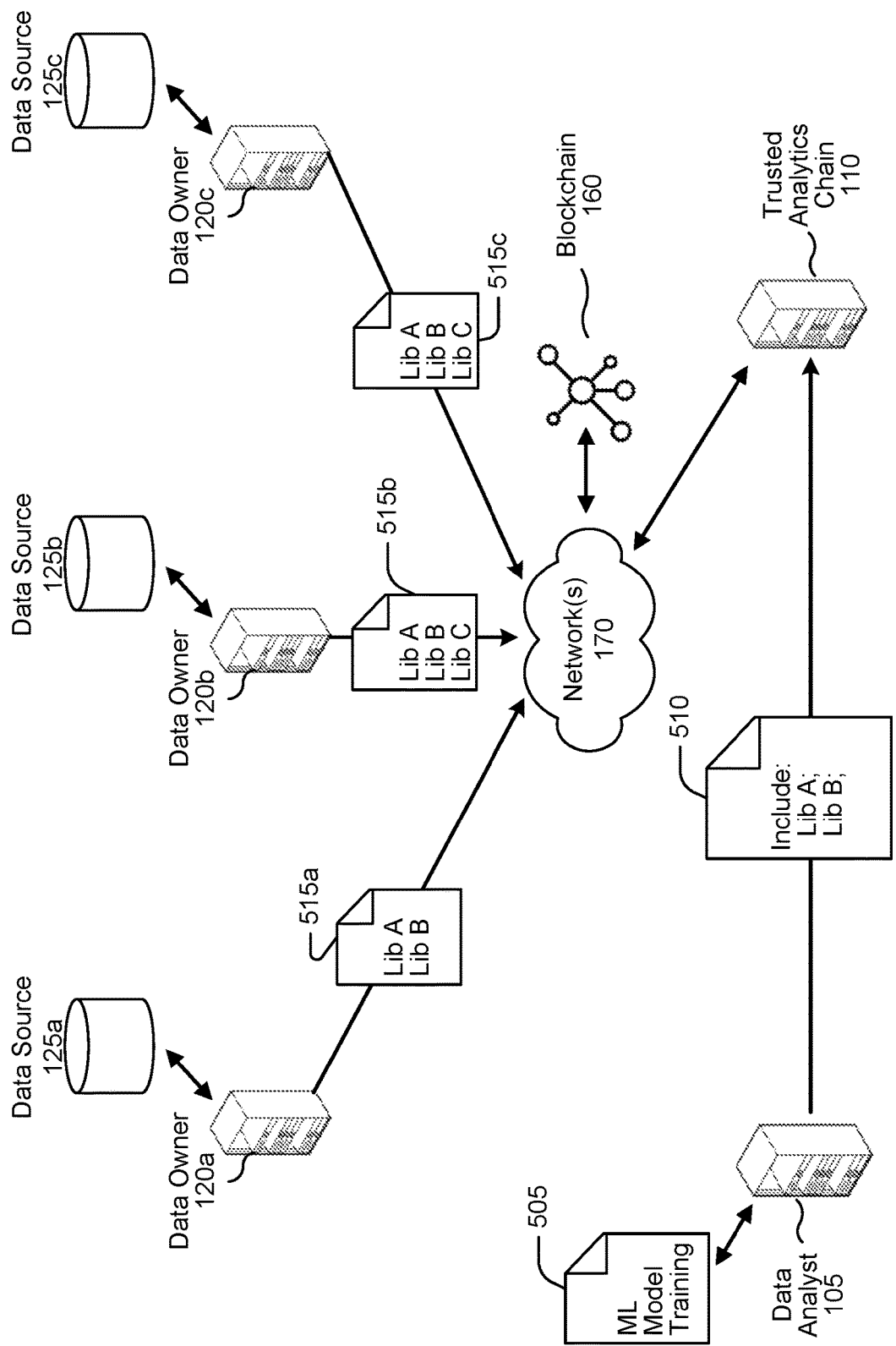
FIG. 5 illustrates an example of federated learning using the methods and techniques of determining permissible functions for program execution, in accordance with some embodiments.

The blockchain may store a plurality of permitted lists, with some permitted lists corresponding to a single data owner and other permitted lists corresponding to multiple data owners. For example, in a federated learning scenario and as shown in FIG. 5, each data owner participating in the federated learning for the training of the neural network may agree upon one or more permitted lists stored on the blockchain. The data analyst developing the neural network may then build the training program for the neural network using the functions identified in those agreed upon permitted lists with assurance that the program will be permitted to execute for each of the participating data owners.

The function libraries identified in a permitted list are not limited to those inherent to a language or those that are previously defined (e.g., network protocol functions). Data owner(s) may build their own libraries using custom defined functions. Multiple data owners may contribute to developing functions and storing both the libraries and the permitted lists identifying the libraries on the blockchain. The data owners that consent to using the function libraries and corresponding permitted lists may provide a digital signature that is also stored on the blockchain.

The permitted lists may include syntax constraints for the permitted functions. The syntax constraints may limit how a function may be called, the return values of the function, and/or other constraints. For example, the permitted list may limit the parameter types of a function. In some instances, syntax restrictions may be used to limit the degree that certain functions may be performed, such as if the function requires a large amount of processing power. For example, some functions used for building neural networks may include parameters for the depth or number of nodes. The permitted list may include syntax restrictions for these parameters. For example, a commonly used machine learning algorithm is random forest. A function library may provide a function to execute the random forest algorithm where the user may specify the number of trees and the maximum depth of the algorithm, such as "run_random_forest(int trees, int depth)". The permitted list may identify that the function (e.g., "run_random_forest" is permitted, but may modify the syntax such that the user may only specify the number of trees, such as "run_random_forest(int trees)". The data owner may control the maximum depth when the function is executed and thus limit the amount of processing used by the function.

A data analyst/model provider may then access the libraries to utilize the provided functions in the construction of their programs. Utilizing these function libraries provided by the data owner(s) assures the data analyst that the functions are permitted, as previously discussed. Additionally, by using the function libraries provided by a group of data owners, the data analyst is also assured that the program can be executed by any one of the participating data owners. The methods and techniques described herein of storing the function libraries and the permitted lists identifying the libraries on the blockchain, grants portability and visibility of the available functions.

FIG. 1 illustrates a system 100 for trusted analytics workflow, in accordance with some embodiments of the present disclosure. The illustrated system 100 may include a network 170. The network 170 may include the Internet and/or any other wide- or local-area network, and may include wired, wireless, and/or cellular network hardware. A TAC 110 may communicate, via the network 170, with one or more data owner systems 120 and data analyst systems 105. The TAC 110 may communicate with a blockchain 160, such as a blockchain database, which itself may include a plurality of devices. The blockchain 160 may exist as part of the TAC 110 (which may control access to the blockchain database) or the blockchain may exist as its own entity and be communicable without going through the TAC 110. A data owner system 120 may provide access to data stored in one or more data sources 125 associated with the data owner system 120.

The blockchain 160 may use blockchain technology, as one of skill in the art will understand, to maintain a public ledger of information. The blockchain 160 may be an example of a distributed consensus mechanism. As a public ledger that is a source of consensus of contents a blockchain may be considered non-refutable. A protocol actor, such as the TAC 110 or DO 120, may not communicate directly with the blockchain database of the blockchain 160; instead, it may communicate using a blockchain market and/or a blockchain agent. The blockchain database(s) may involve many different physical machines that each store all or some portion of the blockchain data. A trusted authority, as part of a blockchain 160, may be a determination of a source of a message to determine the provider/attester of a specific piece of information. Group signatures to the blockchain 160 may be used to allow members of specific groups to attest to a specific fact without revealing their identity.

As shown in FIG. 1, the TAC system 110 may be configured to receive (130), from a first system, such as the data analyst system 105, a first request to execute a computer executable program by a second system, such as the data owner system 120, using first data from a first data source 125 associated with the data owner 120. For example, the computer executable program may be a process to train a machine learning model and the data analyst 105 may be requesting for the data owner 120 to execute the program with the data stored in the data source 125 to train the machine learning model.

In response to receiving the first request, the TAC 110 may be configured to send (132), to at least one device associated with the blockchain 160, a second request to obtain second data indicating a set of function libraries permitted by the second system. The second data may correspond to an agreement between at least a first party and a second party regarding the set of function libraries, such as the permitted list.

The TAC system 110 may be configured to receive (134), from the at least one device associated with the blockchain 160, the second data. The TAC 110 may determine a security protocol based on the first data (e.g., the data to be used in the execution of the computer executable program). The TAC 110 may determine a subset of the set of function libraries based on the security protocol. For example, if the first data includes sensitive data, then the security protocol may limit the available functions. The TAC 110 may update the second data (e.g., the set of function libraries permitted by data owner system 120) as the subset of the set of function libraries.

The TAC 110 may determine (136) using the second data, the computer executable program satisfies a condition. For example, the TAC 110 may determine that computer executable program meets the condition of using functions identified in the set of function libraries permitted by the data owner system 120. The determination that the computer executable program satisfies the condition may include the TAC 110 determining at least one function of computer executable program and comparing the at least one function to the set of function libraries.

The TAC 110 may send (138) the computer executable program to the second system (e.g., the data owner system 120). Based on receiving the program from the TAC 110 the data owner system 120 knows the program has been validated by the TAC 110 and the data owner system 120 may execute the program. The TAC 110 may receive, from the second system (e.g., the data owner system 120) third data corresponding to a result of execution of the computer executable program. The TAC 110 may send the first requesting system (e.g., the data analyst system 105) the third data, and/or the results of execution of the computer executable program.

In the alternative, the TAC 110 may determine the computer executable program does not satisfy the condition. For example, the TAC 110 may determine the computer executable program includes functions or function libraries that are not part of the set of function libraries permitted by the data owner system 120. In response to determining that the computer executable program does not satisfy the condition, the TAC 110 may send a response to the first system (e.g., the data analyst system 105) indicating a rejection of the computer executable program. The response may include additional data such as any non-permitted function included in the computer executable program.

In the present disclosure, a reference to an entity such as a data owner, a data analyst, the TAC, etc. may refer to a computing system, server, virtual machine, computing device, or component associated with that entity, and not necessarily a person or group of that entity.

FIG. 2 illustrates an example abstract syntax tree 210, in accordance with some embodiments. As is known in the art, a computer program may be written in a programming language (e.g., C, Java, Python). A computer program may be compiled by a compiler that translates the computer program from source code (i.e., a human understandable language) to a machine readable language that creates a program executable by the computer. One part of the compilation process may include generating an abstract syntax tree. The abstract syntax tree may represent the structure of the source code for a given program. The structure, representation, and granularity may vary based on the source code language and the compiler.

As shown in FIG. 2, code snippet 200 illustrates a portion of a computer program. The code snippet 200 is represented in the example abstract syntax tree 210. The abstract syntax tree may have nodes representing inherent operations of the programming language, such as the assign node 215 as well as variable or value nodes, such as variable node 220. Finally, function nodes may represent user or library defined functions, such as the foo node 225 and bar node 230.

Figure 3:
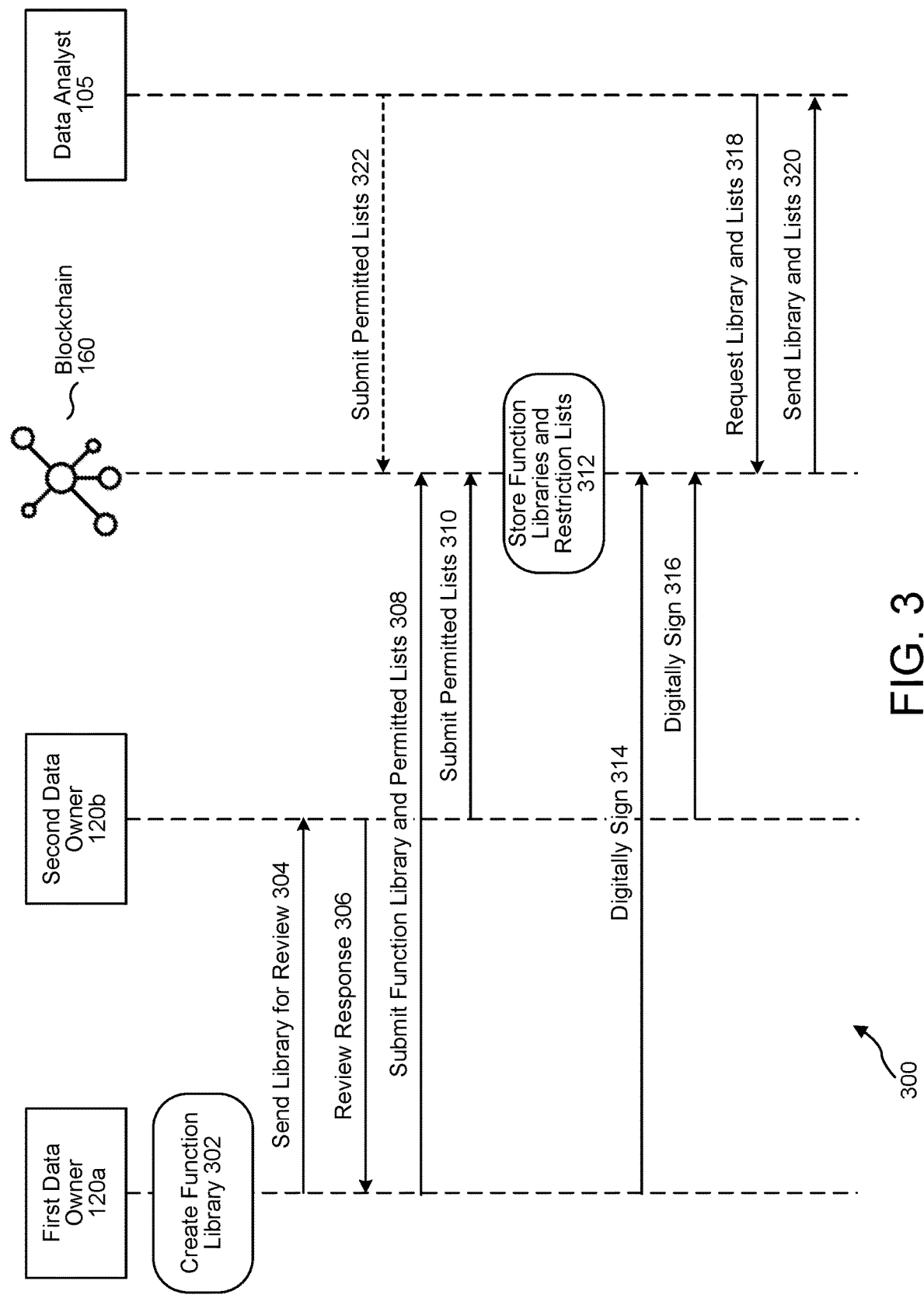
FIG. 3 illustrates an example routine for populating and accessing a function library and associated permitted lists to the blockchain, in accordance with some embodiments.

FIG. 3 illustrates an example routine 300 for populating and accessing a function library and associated permitted lists to the blockchain 160, in accordance with some embodiments. For illustrative purposes, FIG. 3 includes two data owners (e.g., first data owner 120a and second data owner 120b), or blockchain participants. However, any number of data owners may contribute, review, and approve records (i.e., permitted lists) of the blockchain. Additionally, a single function library is described in reference to FIG. 3, but the routine 300 may apply to any number of function libraries.

As shown in FIG. 3, a first data owner 120a may create a function library (302) defining one or more functions for a given programming language. The first data owner 120a may distribute the function library (304) to other data owners (e.g., the second data owner 120b). The other data owners may review the function library and provide feedback (306) to the creator (e.g., the first data owner 120a). This may repeat until the data owners agree on the one or more functions of the function library that are to be considered permitted functions.

The first data owner 120a may submit the function library and their permitted list(s) (308) to the blockchain 160. The other data owners, such as the second data owner 120b that may utilize the function library may submit their own permitted lists (310) applicable to the function library. Submission of permitted lists is available to any entity with access to the blockchain 160. For example, in some embodiments the data analyst 105 may submit permitted lists (322) to the blockchain 160.

The blockchain 160 may store the function library and permitted lists (312), such as the permitted lists received from the first data owner 120a and/or the data analyst 105. The data owners (e.g., the first data owner 120a and the second data owner 120b) may digitally sign (314 and 316) the permitted lists that the data owners approve. The digital signatures may represent approval of the respective permitted list(s). A party may submit a digital signature even for a list it did not submit, thus indicating that the particular permitted list(s) is approved by the party that is submitting its digital signature with regard to that list. For example, the data analyst 105 may submit a permitted list (322) to the blockchain 160. The first data owner 120a may review the permitted list and determine that the permitted list is acceptable. The first data owner 120a may then digitally sign (314) the permitted list that was submitted by the data analyst 105. A digital signature may come in many forms, but represents an electronic indication of approval of the item submitted to the blockchain 160. A particular signature may be verified as coming from an entity in possession of a private key that is paired with a public key that has been made public. Thus, the digital signature is an indication of approval by entity in possession of the private key corresponding to the public key that has been published.

As part of building and developing programs for execution by data owners (e.g., the first data owner 120a and the second data owner 120b), the data analyst 105 may request the function library and permitted lists (318) from the blockchain 160. The blockchain 160 may send the function library and permitted lists (320) to the data analyst 105. The data analyst 105 may then have access to the permitted lists and be provided with data for which functions or function libraries may be permitted to execute with a given data owner. In some embodiments, the data analyst may request the function library and permitted lists (318) via the TAC 110. Thus, the data analyst 105 may configure its programs, etc. using the function library and permitted lists to create executable software that it knows will be approved by the signing data owner(s). Additionally, the data analyst 105 may include the function libraries in their programs so that the programs may call and utilize the functionalities provided by the functions of the function library.

Figure 4:
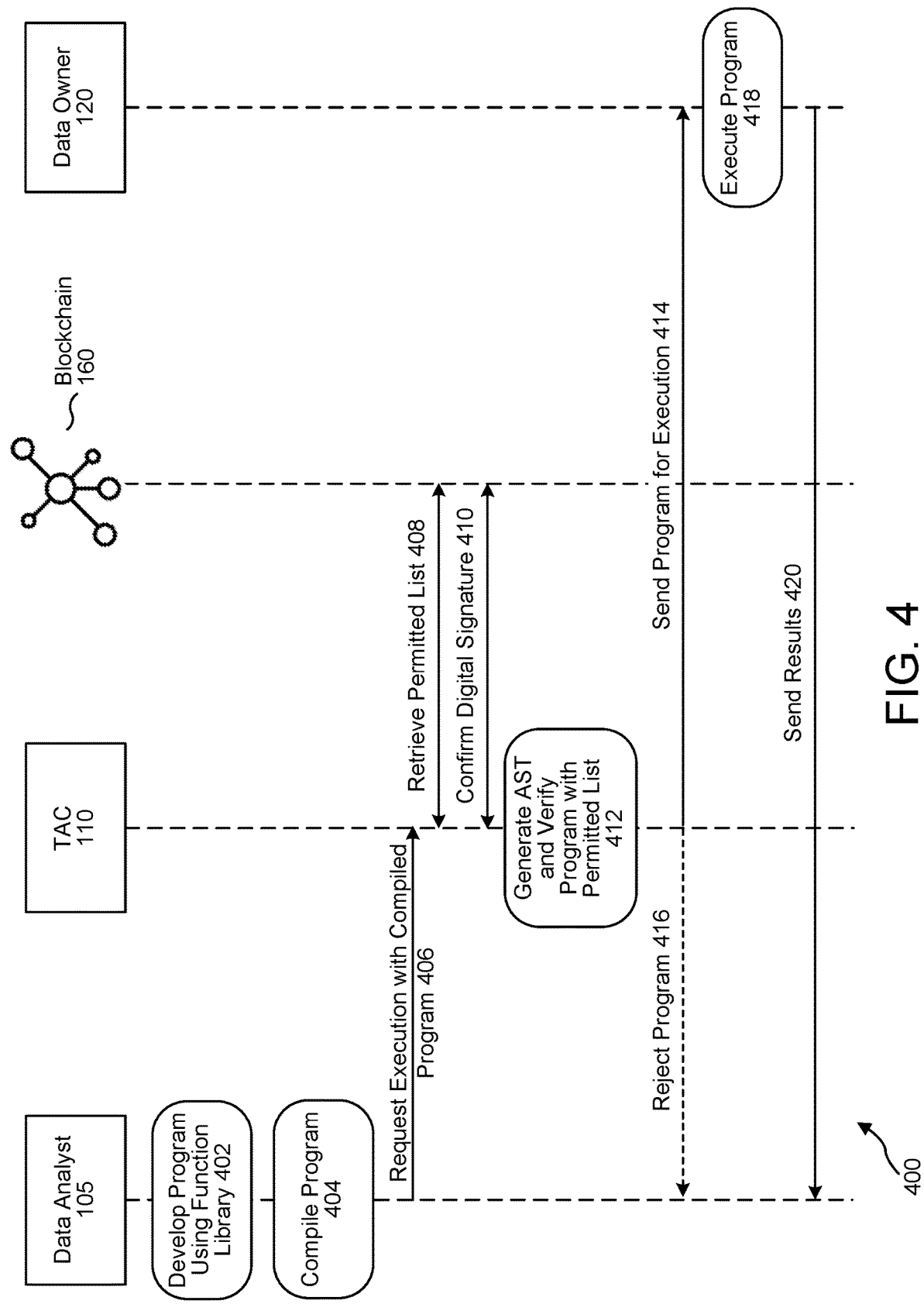
FIG. 4 illustrates an example routine for determining and validating permissible functions for program execution, in accordance with some embodiments.

FIG. 4 illustrates an example routine 400 for determining and validating permissible functions for program execution, in accordance with some embodiments. As described in reference to FIG. 3, the data analyst 105 may request and receive function libraries and permitted lists from the TAC 110. The data analyst 105 may develop programs using the functions provided in the received function libraries (402). Programs may be written for execution by a particular data owner 120, as well for use with a particular data source 125 of the data owner 120. Thus one program may be used for one data source 125a of a particular data owner 120a while a different program may be used for a different data source 125b of the particular data owner 120a.

As previously described in reference to FIG. 3, the data owner 120 may provide permitted lists that identify functions which are permitted for programs submitted for execution to the data owner 120. A data owner 120 may have different permitted lists depending on the data source 125 the program may request for data. For example, a data owner 120 may have two data sources, a first data source 125a and a second data source 125b. The first data source 125a may include general information, such as weather information. The second data source 125b may have sensitive information, such as patient medical records. Thus, the data owner 120 may have different permitted lists for each of the data sources, such as the permitted list for the second data source having a limited amount of available functions based on the sensitive nature of the data stored at the second data source.

The development of the programs and the functions employed may be based on the permitted lists corresponding to the data owner 120 and/or the data source 125. The program may include the function libraries stored on the blockchain 160. A developer may create their own function libraries that call the functions of the data owner provided function libraries. This may allow the developer to use functions and coding style they prefer while keeping the program functionally compliant with the intended permitted list.

When the data analyst 105 is ready to send the program to the data owner 120 for execution the data analyst 105 may compile the program (404). The compilation of the program may include the generation of an abstract syntax tree for the program, such as that shown above in FIG. 2. The data analyst 105 may send a request (406) to the TAC 110 for the execution of the program. The request may include the compiled program and the abstract syntax tree. In some embodiments, the TAC 110 may receive the coded program and the TAC 110 may perform the compilation of the program. The request may include additional identifying information and parameters for the program execution request, such as the identification of the one or more data owners 120 directed to execute the program, the one or more data sources 125 that may be input for the program, contact and credential data for returning the results of the program execution, and/or other information.

The data analyst 105 may write their own user defined functions using the function libraries stored on the blockchain 160, while the user defined functions may still be validated against the permitted lists stored on the blockchain 160 as permissible by analyzing the abstract syntax tree constructed from the program built using the user defined functions. For example, a function library may provide a function such as "combine(int a, int b)" that adds the two parameters (e.g., integer a and integer b). The data analyst or developer may prefer to use function names they are familiar with and thus they may write a function such as "addnumbers(int c, int d)" that then calls the provided "combine" function. When the program is compiled and the abstract syntax tree is generated, different naming conventions (such as "addnumbers") are removed to construct the base operations of the program. In other words, when "addnumbers" is called in the program, the compilation determines that this is a call for "combine" and thus "combine" is the function that is in the compiled program and the abstract syntax tree. Despite the program using "addnumbers" throughout, the compiled program reveals that the call for "addnumbers" is the same as "combine" and the TAC 110 may determine the functions are permitted.

Upon receiving the request from the data analyst 105, the TAC 110 may retrieve the one or more permitted lists (408) from the blockchain 160 that correspond to the request, such as permitted lists corresponding to the requested data owners 120 and/or data sources 125. The TAC 110 may request the digital signature (410) of the data owner 120 for the retrieved permitted list. The digital signature from the data owner 120 for the permitted list may be used by the TAC 110 to confirm that the data owner 120 has approved the permitted list. If the TAC 110 does not locate or receive the digital signature of the data owner 120 for the permitted list, then the TAC 110 may not be able to confirm the data owner 120 has approved the permitted list and may reject the program (416).

The TAC 110 may verify the program (412) using the one or more permitted lists retrieved from the blockchain 160 and corresponding to the execution request. The TAC 110 may verify the program by traversing the abstract syntax tree to identify the functions used in the program and validate that the functions are permitted by cross referencing the functions against the functions in the one or more permitted lists.

In some embodiments, the TAC 110 may take additional steps in the validation and identification of risks associated with the submitted program. The TAC 110 may execute the code of the program step-by-step, such as with dummy data for input. The TAC 110 may execute each syntax step of the program code and track the changes made to memory. The TAC 110 may identify any malicious or unauthorized use or manipulation of the data that may not be identified by the functions alone. In some instances, this may identify deficiencies in functions from the function libraries provided by the data owner 120 that may allow for an actor to submit malicious code using the function libraries.

In some embodiments the TAC 110 may identify privacy risks of the submitted program code when performing the validation. The TAC 110 may annotate elements of the program code with privacy risk metadata. The annotated elements may be sent to the data owner 120 and/or stored on the blockchain 160.

In some embodiments, the TAC 110 may validate that the program meets the conditions of the permitted lists (i.e., the program includes only functions that are permitted by the one or more permitted lists). Upon validation, the TAC 110 may send the program (414) to the data owner 120 for execution. In some embodiments, the TAC 110 may determine that the program does not meet the conditions of the permitted lists (i.e., the program includes functions that are not permitted by the one or more permitted lists). Upon determining that the program does not meet the conditions of the permitted lists, the TAC 110 may send a rejection (416) to the data analyst 105 for the submitted program. The data analyst 105 may modify the program and begin the routine 400 again.

The data owner 120 may receive the program from the TAC 110, including any instructions for execution, such as the intended data source 125 for execution. Based on receiving the program from the TAC 110 as part of the trusted analytics workflow the data owner 120 is assured the program has been validated against the provided restrictions lists and the data owner 120 may execute the program (418). Upon completion of the program execution, the data owner 120 may send the results (420) of the program execution to the data analyst 105 and/or to some other destination. In some embodiments, the data owner 120 may send the results to the data analyst 105 via the TAC 110.

FIG. 5 illustrates an example using the methods and techniques discussed herein for federated learning, in accordance with some embodiments. A machine learning model may be trained using federated learning, in which separate instances of the machine learning model are trained using local data sets from multiple localized data sources. The resulting parameters (e.g., weights and biases of a neural network) from the training at each of the localized data sources are then exchanged, or returned, to the model builder. The model builder, such as a data analyst 105, may then combine the individual results.

As shown in FIG. 5, a data analyst 105 may desire to train, using a machine learning model training program 505, their machine learning model using the data (e.g., data sources 125*a*, 125*b*, 125*c*) from multiple individual data owners (e.g., data owners 120*a*, 120*b*, 120*c*). The data owners may submit one or more permitted lists (e.g., permitted lists 515*a*, 515*b*, 515*c*) for storage on the blockchain 160.

When stored on the blockchain 160 the permitted lists are publicly accessible, but may not be altered based on the nature of the blockchain 160. The data analyst 105 may access the permitted lists on the blockchain 160 to determine which functions and/or function libraries may be permissible for execution of a program by the data owners. As shown in FIG. 5, the permitted lists for data owner 120b and data owner 120c (e.g., permitted lists 515b, 515c) include libraries A, B, and C. While the permitted list 515a for data owner 120a only includes libraries A and B. Thus, for federated learning scenario, if the data analyst 105 would like their program to be executed by all three data owners (e.g., data owners 120a, 120b, 120c), then the program (e.g., the machine learning model training program 505) may only include functions from libraries A and B.

The data analyst 105 may compile the machine learning model training program 505 and send the compiled program 510 to the TAC 110. The compiled program 510 may include an abstract syntax tree of the program 505, as shown in FIG. 2. As shown in FIG. 5, the compiled program 510 may include function libraries A and B. The TAC 110 may validate the compiled program 510. Upon validation, the TAC 110 may send the compiled program 510 to the data owners (e.g., the data owners 120a, 120b, 120c) for execution as part of the federated learning. The data owners may execute the compiled program 510 using the respective data sources (e.g., data sources 125a, 125b, 125c) and return the results to the data analyst 105, as described in reference to FIG. 4.

In an alternate scenario, should the compiled program 510 include libraries A, B, and C, the TAC 110 may validate the program 505 for data owner 120b and data owner 120c, but not data owner 120a. The TAC 110 may send the compile program 510 to data owner 120b and data owner 120c. The TAC 110 may send a rejection to the data analyst 105 indicating that the compile program 510 could not be validated for data owner 120a. In another alternate scenario, should the compiled program 510 include libraries A and B, as well as library D, the TAC 110 may not validate the compiled program 510 for any of the data owners. The TAC 110 may send a rejection to the data analyst 105 indicating that the compiled program 510 could not be validated for data owner 120a, data owner 120b, and data owner 120c.

Figure 6:
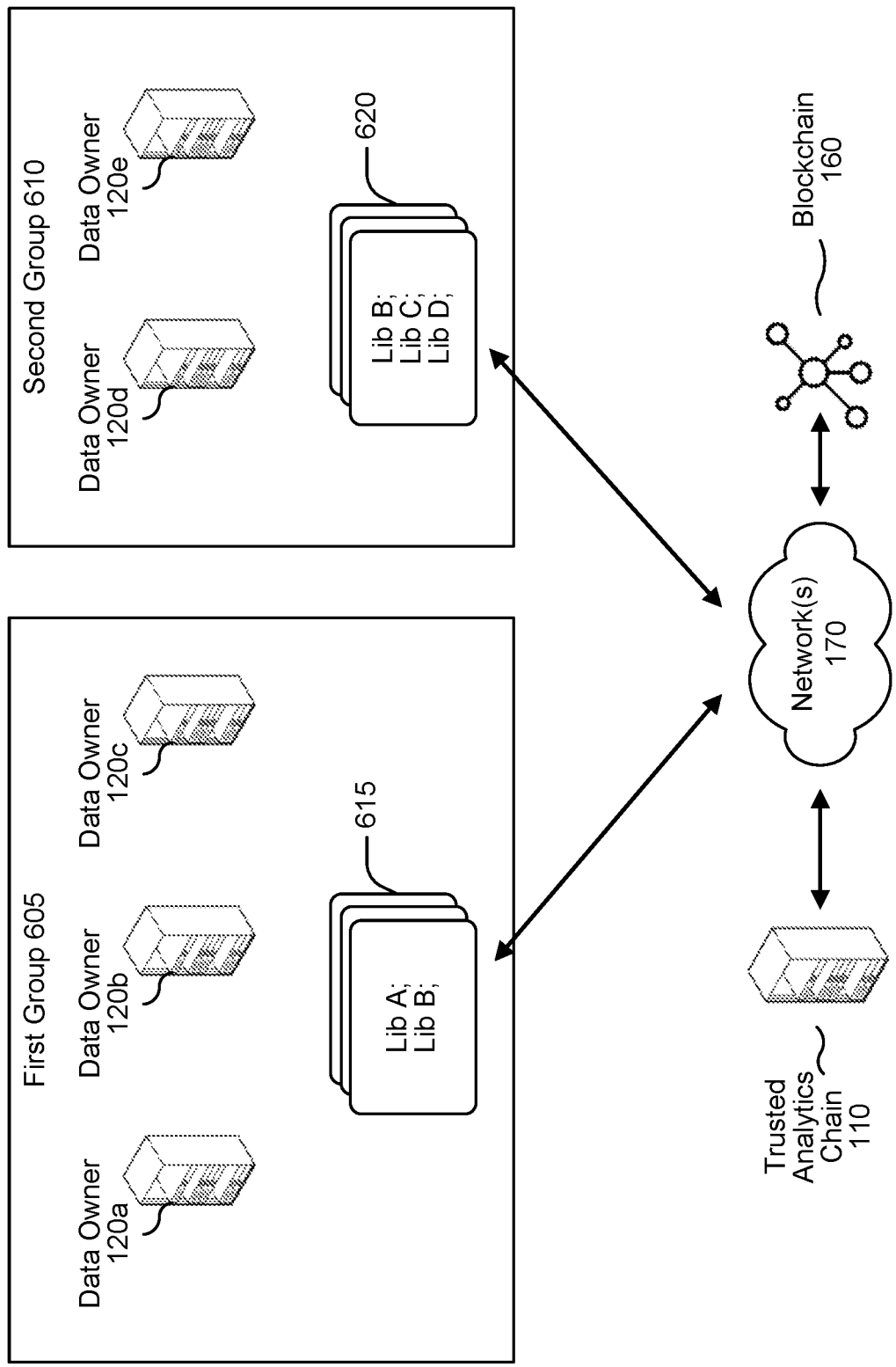
FIG. 6 illustrates an association of permissions lists based on groupings of data owners, in accordance with some embodiments.

FIG. 6 illustrates an association of permissions lists based on groupings of data owners, in accordance with some embodiments. Similar to the federated learning scenario illustrated in FIG. 5, data analysts 105 may request a program be executed by two or more data owners 120. The data owners 120 may be a part of a similar association or grouping, such as first group 605 or second group 610. As shown in FIG. 6, data owner 120a, data owner 120b, and data owner 120c are part of first group 605 and data owner 120d and data owner 120e are part of second group 610.

The data owner groups may determine one or more permitted lists (e.g., permitted lists 615, 620) that apply for the data owners of the group (e.g., first group 605, second group 610). For example, the data owners 120a, 120b, 120c of first group 605 may determine the permission lists (e.g., permitted list 615) that apply to all data owners of the group. This may be decided by voting or other forms of consensus. In some embodiments, a new data owner may request to join the first group 605. The first group 605 may require the new data owner to utilize the permitted lists 615 to be a part of the group.

In some embodiments, the TAC 110 may identify applicable permitted lists based on a group association. The TAC 110 may receive a request from a data analyst 105 for execution of a program by data owner 120c. The TAC 110 may determine that data owner 120c is part of first group 605. Based on data owner 120c being a part of first group 605, the TAC 110 may determine to apply the permitted list 615 for the program submitted by the data analyst.

The data owner groups and the consensus among members may be used to determine different permitted lists based on factors such as the data sources 125 or data owners 120 that are part of the execution requests. Subgroups within a data owner group may generate additional permitted lists, such as based on a union of permitted lists or the intersection of permitted lists.

Figure 7:
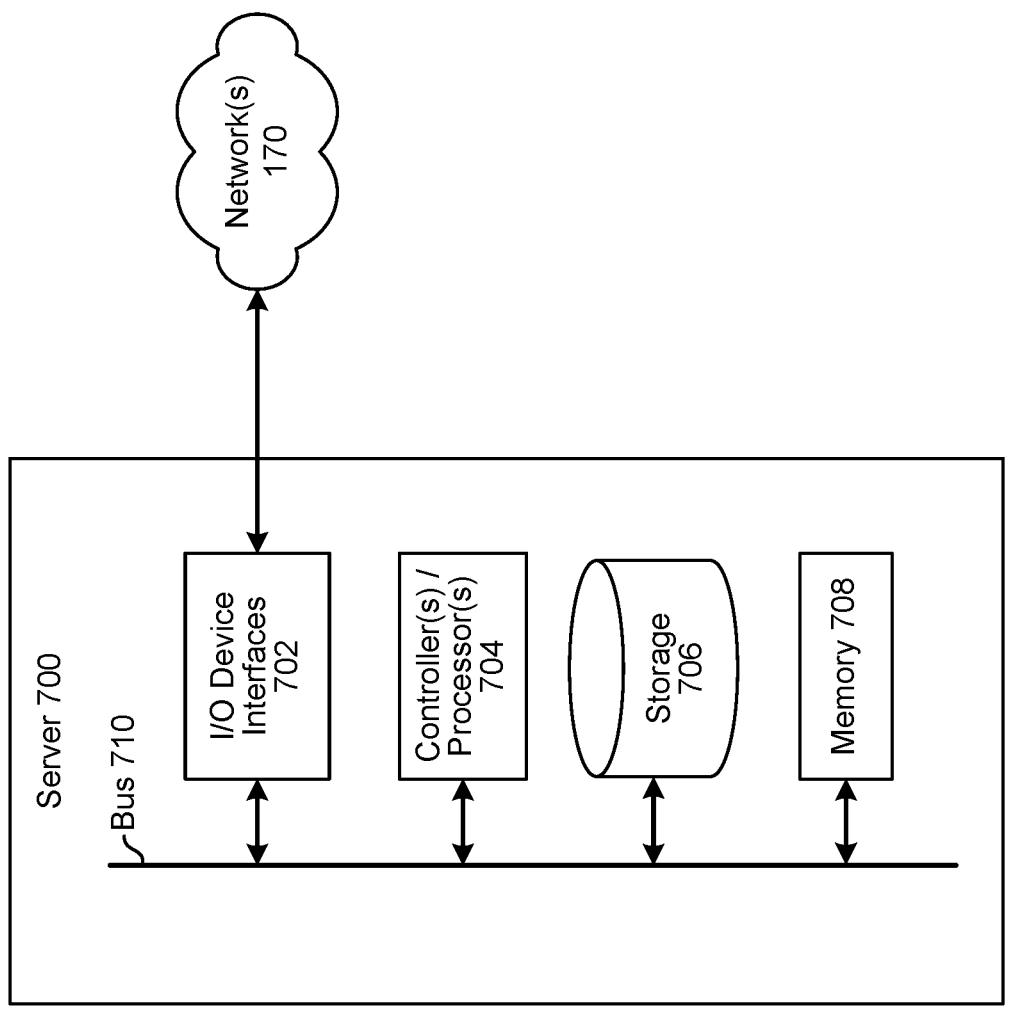
FIG. 7 illustrates components of a system according to embodiments of the present disclosure.

FIG. 7 is a block diagram illustrating a computing environment that includes a server 700; the server 700 may be the TAC 110, the data analyst system 105, the data owner system 120, and/or the blockchain 160. The server 700 may include one or more physical devices and/or one or more virtual devices, such as virtual systems that run in a cloud server or similar environment. The server 700 may include one or more input/output device interfaces 702 and controllers/processors 704. The server 700 may further include storage 706 and a memory 708. A bus 710 may allow the input/output device interfaces 702, controllers/processors 704, storage 706, and memory 708 to communicate with each other; the components may instead or in addition be directly connected to each other or be connected via a different bus.

A variety of components may be connected through the input/output device interfaces 702. For example, the input/output device interfaces 702 may be used to connect to the network 170. Further components include keyboards, mice, displays, touchscreens, microphones, speakers, and any other type of user input/output device. The components may further include USB drives, removable hard drives, or any other type of removable storage.

The controllers/processors 704 may processes data and computer-readable instructions and may include a general-purpose central-processing unit, a specific-purpose processor such as a graphics processor, a digital-signal processor, an application-specific integrated circuit, a microcontroller, or any other type of controller or processor. The memory 708 may include volatile random access memory (RAM), non-volatile read only memory (ROM), non-volatile magnetoresistive (MRAM), and/or other types of memory. The storage 706 may be used for storing data and controller/processor-executable instructions on one or more non-volatile storage types, such as magnetic storage, optical storage, solid-state storage, etc.

Computer instructions for operating the server 700 and its various components may be executed by the controller(s)/processor(s) 704 using the memory 708 as temporary "working" storage at runtime. The computer instructions may be stored in a non-transitory manner in the memory 708, storage 706, and/or an external device(s). Alternatively, some or all of the executable instructions may be embedded in hardware or firmware on the respective device in addition to or instead of software.

Figure 8:
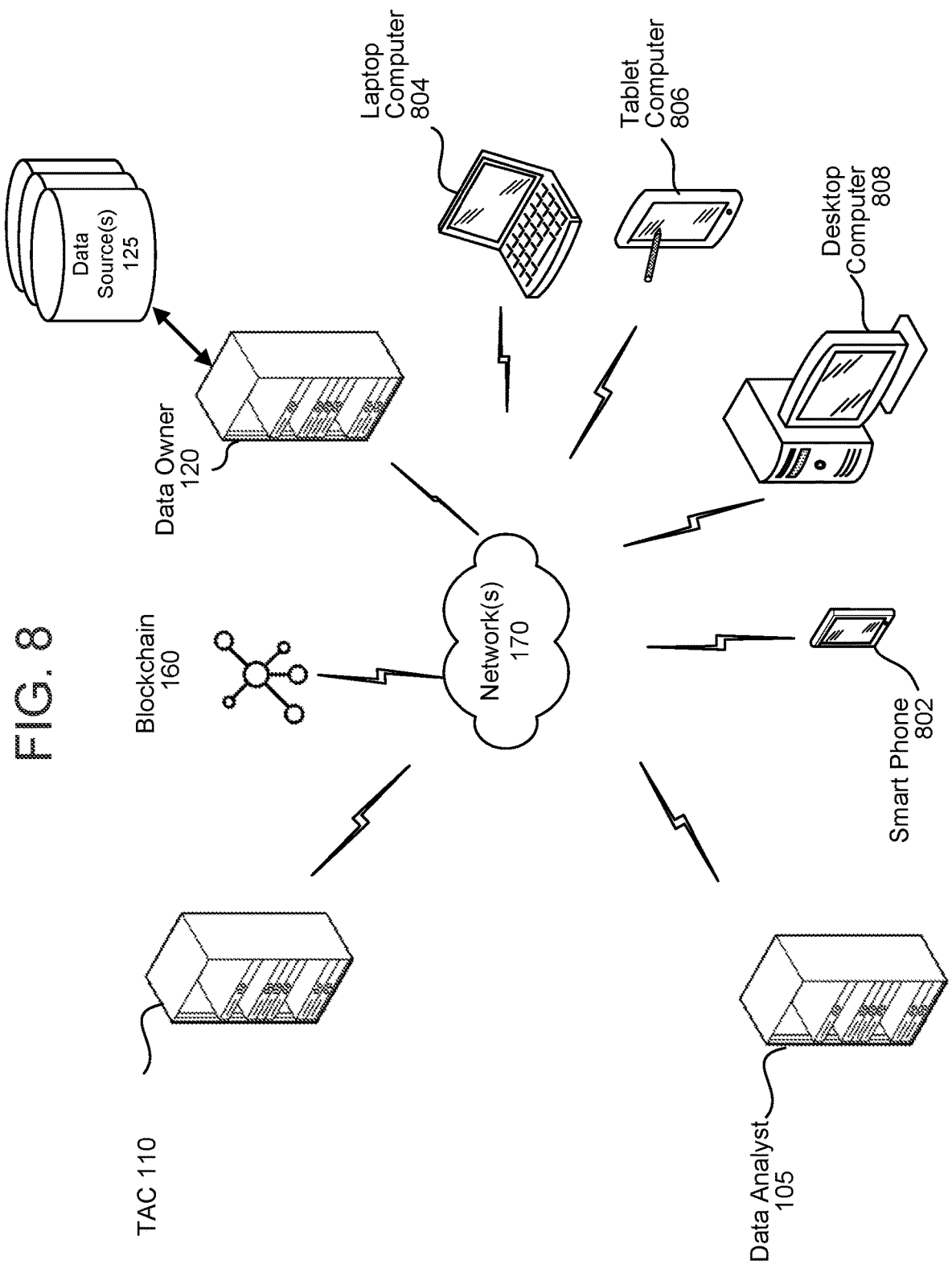
FIG. 8 illustrates a network according to embodiments of the present disclosure.

FIG. 8 illustrates a number of devices in communication with the TAC 110, the data analyst 105, and/or the data owner system 120 using the network 170. The devices may include a smart phone 802, a laptop computer 804, a tablet computer 806, and/or a desktop computer 808. These devices may be used to remotely access the data owner system 120, the data analyst 105, and/or, through such components, the TAC 110, to perform any of the operations described herein.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and data processing should recognize that components and process steps described herein may be interchangeable with other components or steps, or combinations of components or steps, and still achieve the benefits and advantages of the present disclosure. Moreover, it should be apparent to one skilled in the art that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of one or more of the modules and engines may be implemented as in firmware or hardware.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method comprising:
   receiving, from a first system, a first request to have a second system execute a computer executable program using first data from a first data source associated with the second system;
   sending, to at least one device associated with a blockchain, a second request to obtain second data indicating a first set of functions permitted to be executed by the second system, wherein the second data corresponds to an agreement between at least a first party and a second party regarding the first set of functions;
   receiving, from the at least one device, the second data;
   determining third data representing a second set of functions, wherein the second set of functions is a subset of the first set of functions;
   determining, using the third data, the computer executable program satisfies a condition; and
   in response to determining the computer executable program satisfies the condition, sending the computer executable program to the second system.

2. The computer-implemented method of claim 1, further comprising:
   receiving, from the at least one device associated with the blockchain, fourth data representing at least one subset of functions from the first set of functions, the at least one subset of functions corresponding to data sensitivity of the first data source;
   determining a data sensitivity indicator corresponding to the first data; and
   determining, using the fourth data and the data sensitivity indicator, the third data.

3. The computer-implemented method of claim 1, further comprising:
   receiving, from the at least one device associated with the blockchain, fourth data representing at least one subset of functions from the first set of functions, the at least one subset of functions corresponding to a security level of the first data source;
   determining a security level indicator corresponding to the first data; and
   determining, using the fourth data and the security level indicator, the third data.

4. The computer-implemented method of claim 1, further comprising:
   receiving, from the at least one device associated with the blockchain, fourth data representing at least one subset of functions from the first set of functions, the at least one subset of functions corresponding to at least one data content categorization;
   determining a first data content categorization corresponding to the first data; and
   determining, using the fourth data and the first data content categorization, the third data.

5. The computer-implemented method of claim 1, further comprising:
   receiving, from the at least one device associated with the blockchain, fourth data representing at least one subset of functions from the first set of functions, the at least one subset of functions corresponding to at least one data source; and
   determining, based on the fourth data and the first data source, the third data.

6. The computer-implemented method of claim 1, further comprising:
   receiving, from the at least one device associated with the blockchain, fourth data representing at least one subset of functions from the first set of functions, the at least one subset of functions corresponding to at least one quantity threshold;
   determining a first data quantity corresponding to the first data; and
   determining, using the fourth data and the first data quantity, the third data.

7. The computer-implemented method of claim 1, further comprising:
receiving, from the at least one device associated with the blockchain, fourth data representing at least one subset of functions from the first set of functions, the at least one subset of functions corresponding to at least one dataset of a first data owner;
determining a second data owner associated with the first data source;
determining a dataset identifier corresponding to the first data;
determining the second data owner corresponds to the first data owner; and
determining, using the fourth data and the dataset identifier, the third data.

8. The computer-implemented method of claim 1, further comprising:
receiving, from the at least one device associated with the blockchain, fourth data representing at least one subset of functions from the first set of functions, the at least one subset of functions corresponding to at least one type of function;
determining a data type indicator corresponding to at least one data type included in the first data;
determining the data type indicator corresponds to personal information; and
in response to determining the data type indicator corresponds to personal information, determining, using the fourth data and the data type indicator, the third data.

9. The computer-implemented method of claim 1, wherein the first data source includes data from a second data source and a third data source, the second data source associated with a first data owner and the third data source associated with a second data owner; and further comprising:
prior to receiving the first request, receiving, from a third system associated with the first data owner, a second set of functions;
receiving, from a fourth system associated with the second data owner, a third set of functions; and
determining, based on the second set of functions and the third set of functions, the first set of functions.

10. The computer-implemented method of claim 1, prior to receiving the first request, further comprising:
receiving, from a first data owner, a first digital signature corresponding to the first set of functions;
receiving, from a second data owner, a second digital signature corresponding to the first set of functions; and
sending the first digital signature and the second digital signature to at least one device associated with the blockchain in association with the first set of functions.

11. A system comprising:
at least one processor; and
at least one memory including instructions that, when executed by the at least one processor, cause the system to:
receive, from a first system, a first request to have a second system execute a computer executable program using first data from a first data source associated with the second system;
send, to at least one device associated with a blockchain, a second request to obtain second data indicating a first set of functions permitted to be executed by the second system, wherein the second data corresponds to an agreement between at least a first party and a second party regarding the first set of functions;
receive, from the at least one device, the second data;
determine third data representing a second set of functions, wherein the second set of functions is a subset of the first set of functions;
determine, using the third data, the computer executable program satisfies a condition; and
in response to determining the computer executable program satisfies the condition, send the computer executable program to the second system.

12. The system of claim 11, wherein the at least one memory further includes instructions, that, when executed by the at least one processor, further cause the system to:
receive, from the at least one device associated with the blockchain, fourth data representing at least one subset of functions from the first set of functions, the at least one subset of functions corresponding to data sensitivity of the first data source;
determine a data sensitivity indicator corresponding to the first data; and
determine, using the fourth data and the data sensitivity indicator, the third data.

13. The system of claim 11, wherein the at least one memory further includes instructions, that, when executed by the at least one processor, further cause the system to:
receive, from the at least one device associated with the blockchain, fourth data representing at least one subset of functions from the first set of functions, the at least one subset of functions corresponding to a security level of the first data source;
determine a security level indicator corresponding to the first data; and
determine, using the fourth data and the security level indicator, the third data.

14. The system of claim 11, wherein the at least one memory further includes instructions, that, when executed by the at least one processor, further cause the system to:
receive, from the at least one device associated with the blockchain, fourth data representing at least one subset of functions from the first set of functions, the at least one subset of functions corresponding to at least one data content categorization;
determine a first data content categorization corresponding to the first data; and
determine, using the fourth data and the first data content categorization, the third data.

15. The system of claim 11, wherein the at least one memory further includes instructions, that, when executed by the at least one processor, further cause the system to:
receive, from the at least one device associated with the blockchain, fourth data representing at least one subset of functions from the first set of functions, the at least one subset of functions corresponding to at least one data source; and
determine, based on the fourth data and the first data source, the third data.

16. The system of claim 11, wherein the at least one memory further includes instructions, that, when executed by the at least one processor, further cause the system to:
receive, from the at least one device associated with the blockchain, fourth data representing at least one subset of functions from the first set of functions, the at least one subset of functions corresponding to at least one quantity threshold;
determine a first data quantity corresponding to the first data; and
determine, using the fourth data and the first data quantity, the third data.

17. The system of claim 11, wherein the at least one memory further includes instructions, that, when executed by the at least one processor, further cause the system to:

receive, from the at least one device associated with the blockchain, fourth data representing at least one subset of functions from the first set of functions, the at least one subset of functions corresponding to at least one dataset of a first data owner;

determine a second data owner associated with the first data source;

determine a dataset identifier corresponding to the first data;

determine the second data owner corresponds to the first data owner; and determine, using the fourth data and the dataset identifier, the third data.

18. The system of claim 11, wherein the at least one memory further includes instructions, that, when executed by the at least one processor, further cause the system to:

receive, from the at least one device associated with the blockchain, fourth data representing at least one subset of functions from the first set of functions, the at least one subset of functions corresponding to at least one type of function;

determine a data type indicator corresponding to at least one data type included in the first data;

determine the data type indicator corresponds to personal information; and in response to determining the data type indicator corresponds to personal information, determine, using the fourth data and the data type indicator, the third data.

19. The system of claim 11, wherein the first data source includes data from a second data source and a third data source, the second data source associated with a first data owner and the third data source associated with a second data owner; and wherein the at least one memory further includes instructions, that, when executed by the at least one processor, further cause the system to:

prior to receiving the first request, receive, from a third system associated with the first data owner, a second set of functions;

receive, from a fourth system associated with the second data owner, a third set of functions; and determine, based on the second set of functions and the third set of functions, the first set of functions.

20. The system of claim 11, wherein, prior to receiving the first request, the at least one memory further includes instructions, that, when executed by the at least one processor, further cause the system to:

receive, from a first data owner, a first digital signature corresponding to the first set of functions;

receive, from a second data owner, a second digital signature corresponding to the first set of functions; and send the first digital signature and the second digital signature to at least one device associated with the blockchain in association with the first set of functions.

* * * * *